(12) United States Patent
Barowski et al.

(10) Patent No.: US 8,375,345 B1
(45) Date of Patent: Feb. 12, 2013

(54) SOFT-BOUNDED HIERARCHICAL SYNTHESIS

(75) Inventors: Harry Barowski, Böblingen (DE);
Harald Mielich, Stuttgart (DE);
Friedrich Schröder, Stuttgart (DE);
Alexander Wörner, Böbingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/398,490

(22) Filed: Feb. 16, 2012

(51) Int. Cl.
*G06F 17/50* (2006.01)
*G06F 11/22* (2006.01)
*G06F 9/455* (2006.01)

(52) U.S. Cl. ......... 716/119; 716/104; 716/126; 716/132

(58) Field of Classification Search .................. 716/104, 716/119, 126, 132
See application file for complete search history.

(56) References Cited

U.S. PATENT DOCUMENTS

| | | | |
|---|---|---|---|
| 5,984,510 A * | 11/1999 | Guruswamy et al. | 716/54 |
| 6,209,123 B1 * | 3/2001 | Maziasz et al. | 716/123 |
| 6,378,123 B1 | 4/2002 | Dupenloup | |
| 7,290,226 B2 | 10/2007 | Correale, Jr. et al. | |
| 8,122,406 B2 * | 2/2012 | Sheu et al. | 716/110 |
| 2008/0127018 A1 * | 5/2008 | Alpert et al. | 716/10 |
| 2009/0019404 A1 * | 1/2009 | Sadakane | 716/4 |
| 2009/0031278 A1 * | 1/2009 | McElvain et al. | 716/18 |
| 2011/0055786 A1 * | 3/2011 | Gao | 716/126 |
| 2012/0151429 A1 | 6/2012 | Barowski et al. | |
| 2012/0233577 A1 * | 9/2012 | Chandra et al. | 716/105 |

* cited by examiner

*Primary Examiner* — Stacy Whitmore
*Assistant Examiner* — Magid Dimyan
(74) *Attorney, Agent, or Firm* — Matthew B. Talpis; Jack V. Musgrove

(57) ABSTRACT

A large block synthesis (LBS) process pre-optimizes selected submacros by synthesizing the submacros using timing assertions and placement abstracts, removing placement information, and assigning weights to the internal nets of the submacros that are much higher than weights used for external (e.g., top-level) nets. The timing assertions include an input arrival time, a required output arrival time, and an output pin capacitance loading for the logic block, and the placement abstract is generated by condensing input and output pins of the logic block at a center of gravity of the logic block. The submacros to be pre-optimized can automatically be identified using an attribute to indicate pre-optimization, or by determining that the submacro is one of many instances in the design. The higher weights for the submacro nets define soft-bounds for the logic which still allow relocation of submacro components. The pre-optimization results in significantly reduced synthesis runtime.

18 Claims, 5 Drawing Sheets

SOFT-BOUNDED HIERARCHICAL SYNTHESIS

BACKGROUND OF THE INVENTION

1. Field of the Invention

The present disclosure generally relates to the fabrication and design of semiconductor chips and integrated circuits, and more particularly to the physical layout (placement) of logic cells in an integrated circuit design.

2. Description of the Related Art

Integrated circuits are used for a wide variety of electronic applications, from simple devices such as wristwatches, to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for routing, such as a polysilicon layer and three metal layers (metal-1, metal-2, and metal-3). The polysilicon layer, metal-1, metal-2, and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections, between the cell pins, including information about the various components such as transistors, resistors and capacitors. A layout typically consists of a set of planar geometric shapes in several layers. The layout is checked to ensure that it meets all of the design requirements, particularly timing requirements. The result is a set of design files known as an intermediate form that describes the layout. The design files are then run through a dataprep process that is used to produce patterns called masks by an optical or electron beam pattern generator. During fabrication, these masks are used to etch or deposit features in a silicon wafer in a sequence of photolithographic steps using a complex lens system that shrinks the mask image. The process of converting the specifications of an electrical circuit into such a layout is called the physical design.

Cell placement in semiconductor fabrication involves a determination of where particular cells should optimally (or near-optimally) be located on the surface of a integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn around time and enhanced chip performance. Several different programming languages have been created for electronic design automation (EDA), including Verilog, VHDL and TDML. A typical EDA system receives one or more high level behavioral descriptions of an IC device, and translates this high level design language description into netlists of various levels of abstraction.

Physical synthesis is prominent in the automated design of integrated circuits such as high performance processors and application specific integrated circuits (ASICs). Physical synthesis is the process of concurrently optimizing placement, timing, power consumption, crosstalk effects and the like in an integrated circuit design. This comprehensive approach helps to eliminate iterations between circuit analysis and place-and-route. Physical synthesis has the ability to repower gates (changing their sizes), insert repeaters (buffers or inverters), clone gates or other combinational logic, etc., so the area of logic in the design remains fluid. However, physical synthesis can take days to complete, and the computational requirements are increasing as designs are ever larger and more gates need to be placed. There are also more chances for bad placements due to limited area resources.

Current microprocessor trends are integrating traditionally custom designs with random logic macros (RLMs) into very large integrated circuit designs. In some cases, entire microprocessor units are designed using an automated synthesis flow that integrates these traditional custom designs and RLMs. This type of merged synthesis run is referred to as large block synthesis (LBS). The LBS blocks, i.e., sets of cells or logic modules, require handling dataflow designs differently than traditional RLMs. In this process the entire logic is usually flattened out, and timing-critical logic portions can be pre-optimized in order to improve the overall result. This pre-optimization uses multiple copies (instances) of the same block of logic whose cells have already been placed and routed. These hard-bounded blocks are fed into the flat synthesis. FIG. 1 illustrates a simplified example for a floating-point unit (FPU) 2 having multiple instances 4 of an adder submacro which have been inserted in this manner. While FIG. 1 depicts adders with a generally rectangular boundary, the pre-optimized blocks may have other hard-bounded shapes as well.

SUMMARY OF THE INVENTION

The present disclosure is directed to a method of laying out an integrated circuit design by receiving a machine-readable description of the integrated circuit design, identifying at least one logic block in the description which is to be pre-optimized for placement, deriving timing assertions for the logic block, generating a placement abstract for the logic block, synthesizing the logic block using the timing assertions and the placement abstract, removing placement information for the synthesized logic block, assigning lower-hierarchical weights to internal nets which interconnect cells inside the logic block, assigning higher-hierarchical weights to external nets which interconnect cells outside of the logic block wherein the lower-hierarchical weights are greater than the upper-hierarchical weights, and placing cells inside the logic block and the cells outside the logic block with a wirelength optimization using the assigned lower-hierarchical weights and the assigned higher-hierarchical weights. The logic block can be identified by determining that the machine-readable description contains an attribute for the logic block set to indicate pre-optimization, or by determining that the logic block is one of a plurality of logic blocks in the machine-readable description constituting multiple instances of a single logic function. In the illustrative implementation, the timing assertions include an input arrival time, a required output arrival time, and an output pin capacitance loading for the logic block, and the placement abstract is generated by condensing input and output pins of the logic block at a center of gravity of the logic block. The lower-hierarchical weights are preferably significantly higher than the lower-hierarchical weights, such as by an order of magnitude (e.g., lower-hierarchical weights of 10, and higher-hierarchical weights of 1).

The above as well as additional objectives, features, and advantages of the present disclosure will become apparent in the following detailed written description.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The use of pre-optimized logic blocks (macros or submacros) can speed up automated synthesis flow and is particularly helpful for complicated designs undergoing large block synthesis (LBS). The terms "macro" and "submacro" as used herein are generally interchangeable and denote a logic block which is a portion of a circuit being placed but less than the entire circuit. While a submacro usually refers to a logic block at a lower hierarchical level, this context is relative and a submacro in one design may be considered a macro in another design. These words accordingly should not be construed in a limiting sense, and designers may refer to such logic with other terms including cell, IP block, sub-block, circuit element, gate structure, etc., or by specific functionality such as memory or latch array.

However, the use of submacros having hard (fixed) boundaries can create placement inefficiencies. A submacro may be optimized for general circumstances but the specific placement of that submacro in a particular design can result in significant differences in timing at boundaries or placement of nearby objects. As process technology scales to the deep-submicron regime, timing is becoming increasingly critical to the performance and reliability of IC chips and systems. Consequently, these problems with hard-bounded submacros can lead to bad placements, and increase computation time (i.e., expense). These problems can occur regardless of the particular shape of the submacro, so providing submacros with irregular shapes generally is not helpful in this regard.

In light of the foregoing, it would be desirable to devise an improved placement method which could allow submacros to adapt to local conditions of a specific design. It would be further advantageous if the method could allow a single design to have multiple instances of a submacro with each instance individually adapting to its surroundings. The present disclosure achieves these advantages by providing a method for using soft-bounded submacros in LBS. The soft-bounded submacros may be implemented by abstracting a logic block, removing placement information, and then assigning weights to internal nets of the block that are significantly higher than net weights generally assigned to the overall synthesis process, e.g., the top-level flat synthesis. The higher weights for the internal submacro nets impart a "togetherness" for the critical portions of the logic that defines the soft-bounds but still allows for relocation of submacro components. A method is also provided for automatically identifying which logic blocks for a given hierarchical design should be pre-optimized in this manner.

Figure 2:
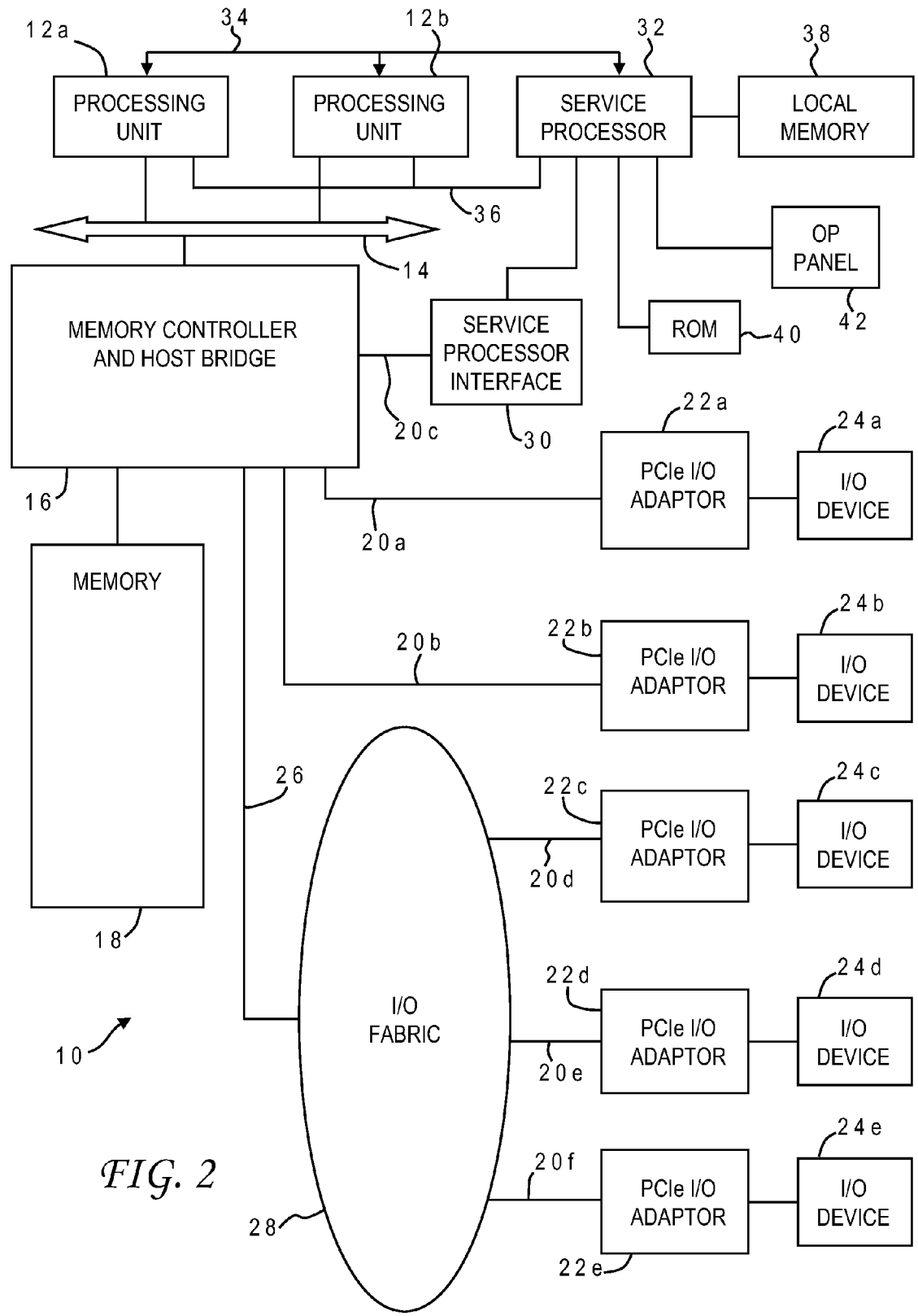
FIG. 2 is a block diagram of a computer system programmed to carry out integrated circuit design in accordance with one implementation of the present disclosure.

With reference now to the figures, and in particular with reference to FIG. 2, there is depicted one embodiment 10 of a computer system in which the present disclosure may be implemented to carry out the design and synthesis of integrated circuits. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20*c* connects MC/HB 16 to a service processor interface 30 to allow communications between I/O device 24*a* and a service processor 32. Service processor 32 is connected to processors 12*a*, 12*b* via a JTAG interface 34, and uses an attention line 36 which interrupts the operation of processors 12*a*, 12*b*. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present disclosure. The disclosure may further be implemented in an equivalent cloud computing network.

When computer system 10 is initially powered up, service processor 32 uses JTAG interface 34 to interrogate the system (host) processors 12*a*, 12*b* and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12*a*, 12*b* for execution of the program code, e.g., an operating system (OS) which is used to launch applications and in particular the circuit design application of the present disclosure, results of which may be stored in a hard disk drive of the system (an I/O device 24). While host processors 12*a*, 12*b* are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and stored in a computer memory. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media excludes transitory media such as propagating signals.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for an integrated circuit design synthesis process that uses novel optimization techniques to manage submacro placement. Accordingly, a program embodying the invention may include conventional aspects of various synthesis and placement tools, and these details will become apparent to those skilled in the art upon reference to this disclosure.

Figure 3:
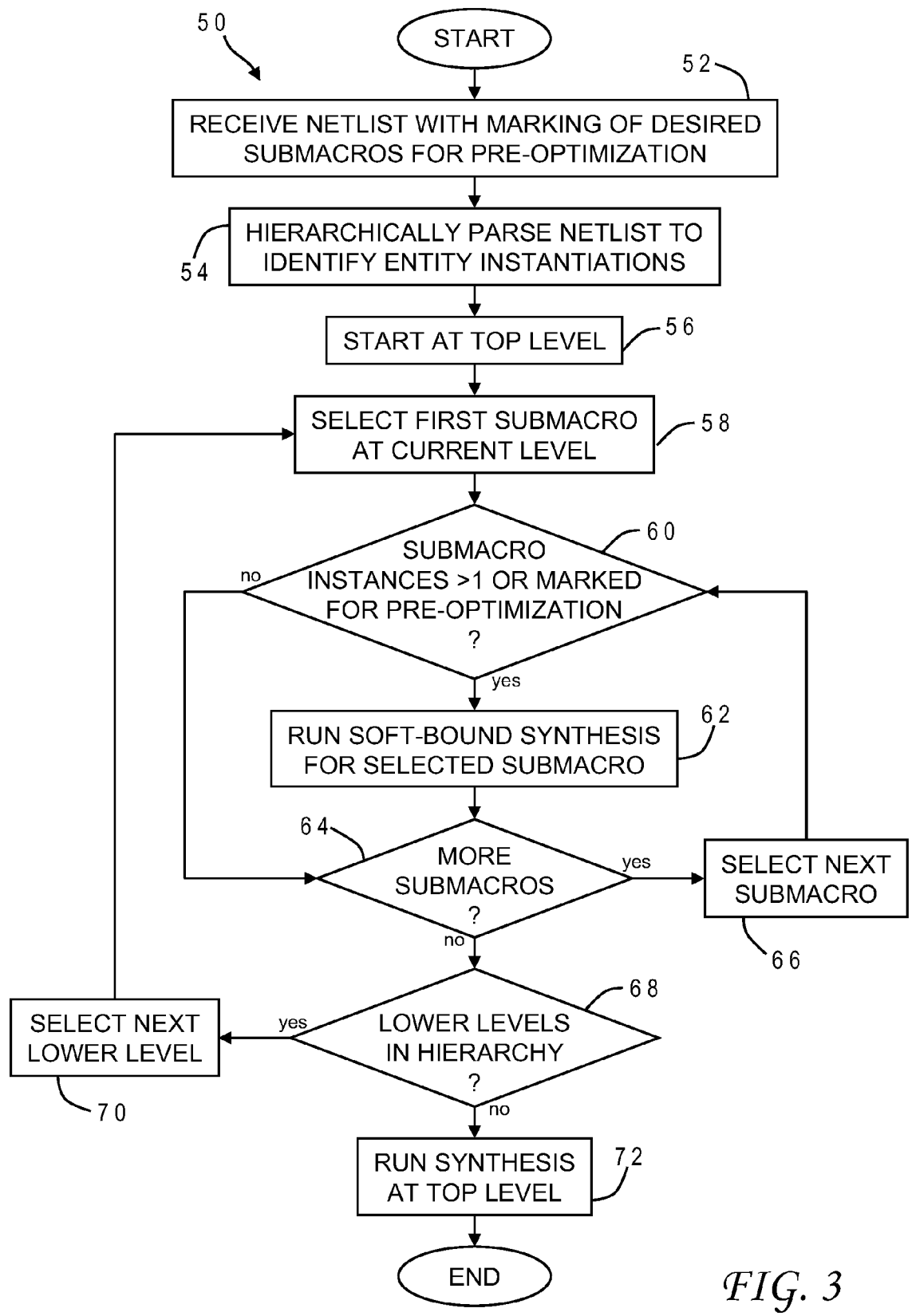
FIG. 3 is a chart illustrating the logical flow for a synthesis operation used in the design of an integrated circuit in accordance with one implementation of the present disclosure.

Referring now to FIG. 3, there is depicted a chart illustrating the logical flow for a synthesis operation 50 in accordance with one implementation of the present disclosure. Process 50 begins by receiving a netlist, or circuit description in hardware description language (HDL), for the integrated circuit design to be synthesized (52). The netlist can include indications for any submacros that are to be pre-optimized, i.e., a single-bit flag (custom HDL attribute) is set for the submacro structure. The desired submacros can be manually marked by a designer or can be a default setting in the macro library for critical submacros. The netlist is hierarchically parsed to identify entity instantiations (54). "Hierarchically" refers to parsing the netlist at different logical levels, e.g., a top-level which includes all of the circuit components to be placed, and lower levels within a particular macro or submacro as designated by the netlist. For example, the top-level may be found to have one or more macros which multiple instances, and one of those macros may itself be constructed of one or more submacros having multiple instances within that macro.

The process then selects the top-level to begin inspection for blocks to be pre-optimized (56). Computer system 10 examines each submacro beginning with the first submacro listed for the current level, i.e., the top level during the first iteration (58). A determination is made as to whether the selected submacro has multiple instances or has been marked for pre-optimization (60). If either is true, the submacro is synthesized in accordance with the present disclosure for pre-optimization (62), as explained further below in conjunction with FIG. 5. Otherwise the process continues by checking to see if there are still more submacros in the current level (64). If so, the next submacro is selected (66), and the process repeats iteratively at box 60. Once all of the submacros for the current level have been examined, the process checks for any lower levels in the hierarchy (68). The next lower level is selected (70), and the process repeats iteratively at box 58 until all desired submacros at all levels have been pre-optimized. After pre-optimization is complete, computer system 10 runs a synthesis at the top level (72). The result is a flattened placement, and conventional routing (wiring) can be performed to produce the final integrated circuit design layout.

Figure 4:
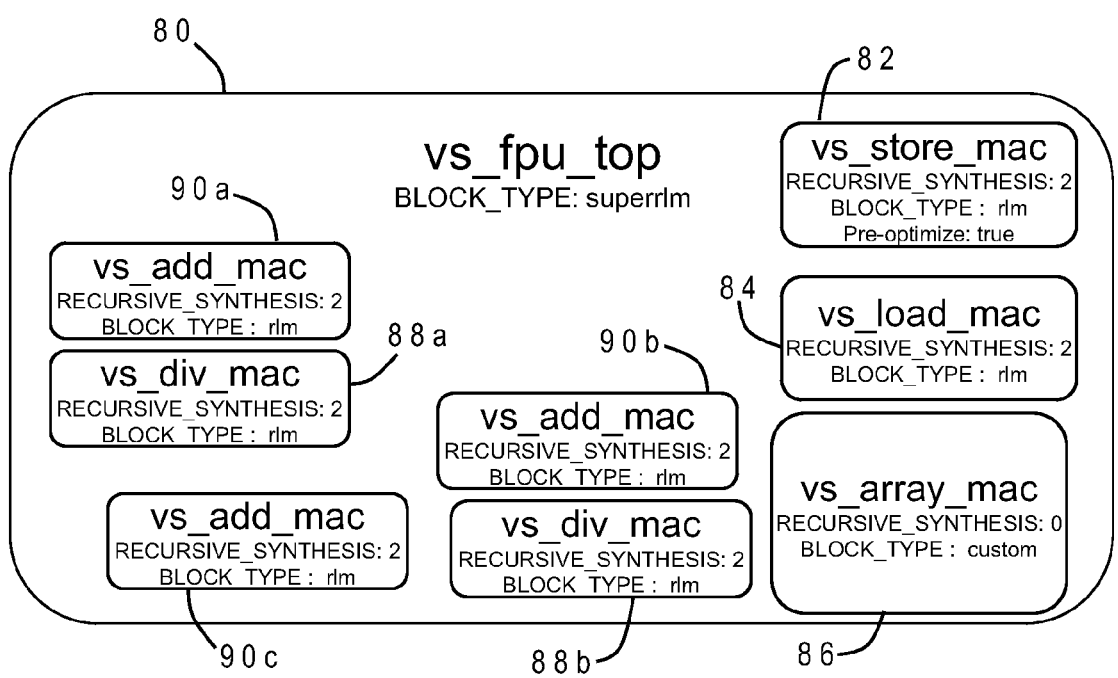
FIG. 4 is a graphical representation of a circuit description for an FPU having various macros, some with multiple instances and some having a flag indicating that the macro should be pre-optimized, in accordance with one implementation of the present disclosure.

FIG. 4 is a graphical representation of a circuit description for a simplified example of a floating-point unit (FPU) integrated circuit design 80 (vs_fpu_top) in accordance with one implementation of the present disclosure. FPU 80 may have one or more HDL attributes such as a block type which in this case is set to super RLM (random logic macro). FPU 80 is comprised of various macros including a store operation macro (vs_store_mac) 82, a load operation macro (vs_load_mac) 84, an array macro (vs_array_mac) 86, two instances of a divider macro (vs_div_mac) 88a, 88b, and three instances of an adder macro (vs_add_mac) 90a, 90b, 90c. Each macro may again have one or more HDL attributes. In this case each macro except the array macro is a block type RLM, while the array macro is a custom block type. A recursive synthesis attribute may be used to indicate the number of iterations of synthesis for each macro (set to 2 for all macros except the array macro, which is set to 0). Store macro 82 has also been marked for pre-optimization by setting the Pre-optimize attribute to True.

For this example, when computer system 10 is executing the synthesis operation 50 it will pre-optimize not only store macro 82 which has been flagged, but will further automatically parse the netlist to determine that the adder and divider macros have multiple instantiations and so will also pre-optimize macros 88a, 88b, 90a, 90b and 90c. Once all of those macros have been pre-optimized, synthesis is carried out for the top-level FPU 80.

Figure 5:
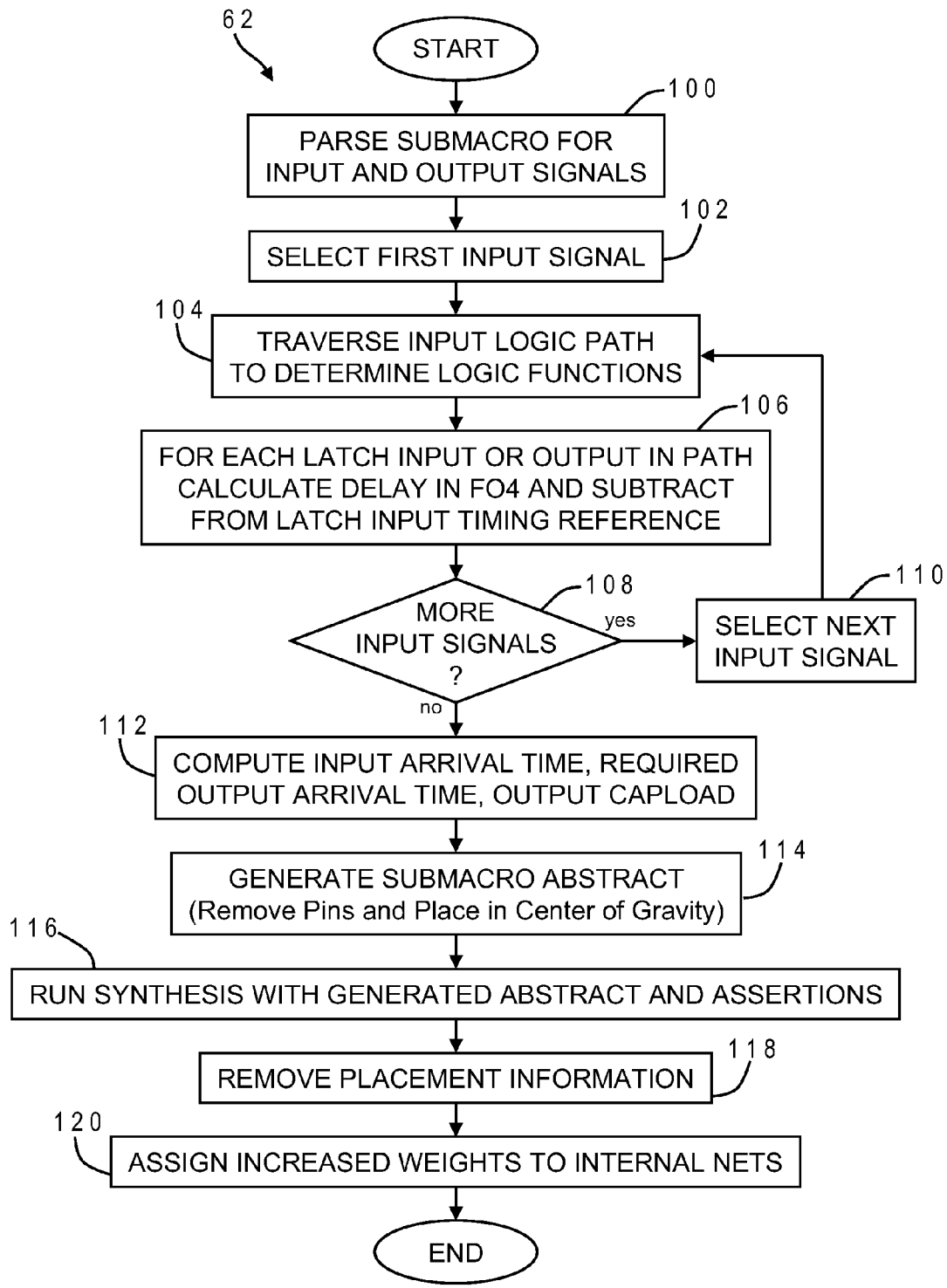
FIG. 5 is a chart illustrating the logical flow for a pre-optimization process carried out for selected macros or submacros in which increased weights are assigned to internal nets of the pre-optimized logic block in accordance with one implementation of the present disclosure.

FIG. 5 illustrates the logical flow for a pre-optimization process 62 carried out for the selected submacros in accordance with one implementation of the present disclosure. Timing assertions and a placement abstract need to be defined prior to synthesis of a submacro, and may be provided directly by the designer, but preferably they are included as part of the automated flow. The pre-optimization process 62 accordingly begins by parsing the netlist to identify the input and output signals for the current submacro (100). Each input signal is analyzed beginning with the first input signal in the list (102). The input logic path from the input signal is traversed to list logic functions along the path (104). For every latch input or latch output identified along the path, the path delays are determined. For example, the path delays may include an input arrival time, a required output arrival time, and an output capacitance load for each input signal of the subject logic function type. These delays may be calculated using various conventional techniques. In the illustrative implementation the number of logic cones before a given latch is counted and translated into FO4 numbers which are subtracted from the latch input timing reference (106). FO4 is a delay metric used in digital CMOS technologies. FO4 numbers are technology-dependent and can directly and automatically be used to calculate a reasonable arrival time at the input. Similarly a backward tracing is done starting at component outputs until a latch is found. In this manner a required arrival time can be derived for each output. If there are more input signals (108), the next input signal is selected and the process iteratively repeats at box 104 until all paths have been traversed, Once all of the FO4 numbers have been calculated, computer system 10 can compute the submacro's input arrival time, required output arrival time, and output capacitance load (112).

After generating these timing assertions, computer system 10 generates a placement abstract for the current submacro (114). The abstract, which directs input and output pin placements for the logic function type, is obtained by modifying the top-level hierarchy abstract provided with the hardware function operation descriptions of the circuit in HDL. The top-level description is modified by removing all input and output pins from the layout, except for the input and output pins of the respective logic function type to be synthesized. These logic unit pins are condensed at a center of gravity of the submacro layout so as to be consolidated in a logic function type pin layout. In this manner the synthesis optimizes on timing only and is not primarily influenced by placement constraints. The submacro may then be synthesized using the generated abstract and assertions (116). The abstract essentially denotes the available area, while the input arrival time, required output arrival time and output capacitance load are provided for the top-level hardware function operations. The submacro synthesis may include multiple iterations.

Figure 6:
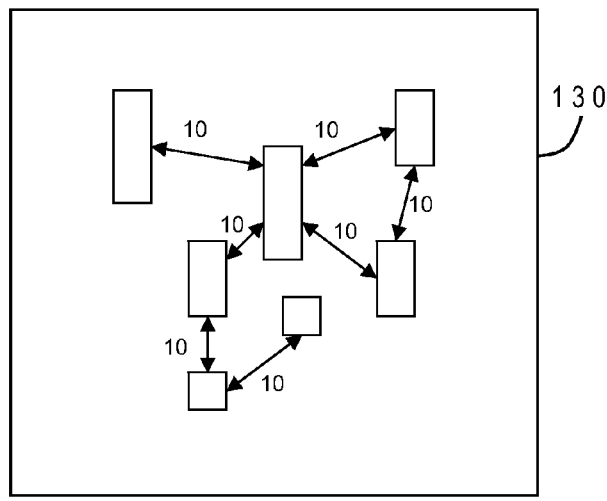
FIG. 6 is a pictorial illustration of the internal nets of an abstracted submacro having the increased net weights in accordance with one implementation of the present disclosure.

The synthesized submacro can be compiled into a netlist for the logic function type which is timing optimized and contains technology-mapped gates each having a placement record. Placement information is next removed from this netlist (118). The final step in the pre-optimization process 62 is to assign increased (custom) weights to the internal nets of the submacro, i.e., nets which are not connected to an input or output pin (120). The same weight is preferably applied to all of the internal nets, although different weights could be used, for example, depending on metrics like timing criticality, Steiner net length, fanout, etc. The internal net weight is greater than the synthesis default (top-level) net weight, preferably significantly greater. For example, if the default net weight is 1, an appropriate weight for the submacro internal nets might be 10 (an order of magnitude higher). FIG. 6 shows such an example wherein the internal nets of an abstracted submacro 130 have been assigned a weight of 10. These weights are used by the placement tool in optimizing wirelength, i.e., they are used as coefficients for the respective net wirelengths in the optimization formulas. The resulting pre-optimized submacro netlist files are fed into the final (top-level) synthesis process after cell technology mapping. The top-level synthesis has complete freedom to move cells, but the higher net weights will keep adjacent logic of the submacro close together.

Figure 1:
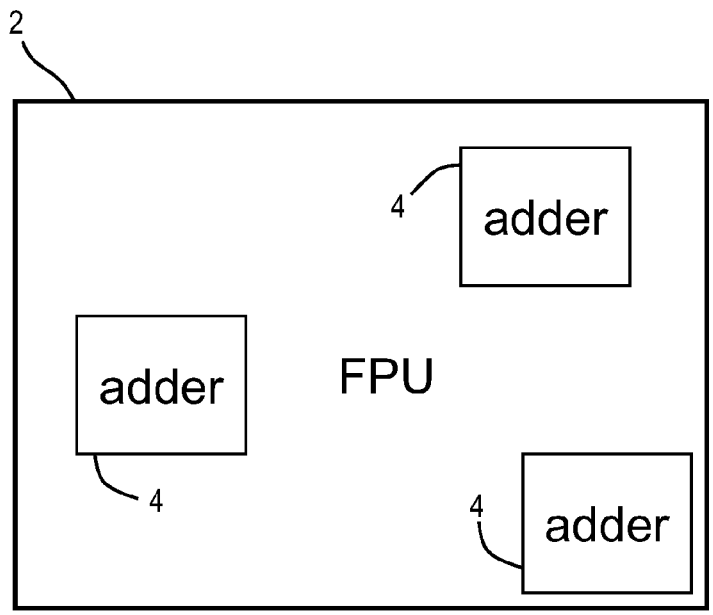
FIG. 1 is a plan view of a floating-point unit (FPU) having multiple instances of an adder submacro with hard boundaries.
Figure 7:
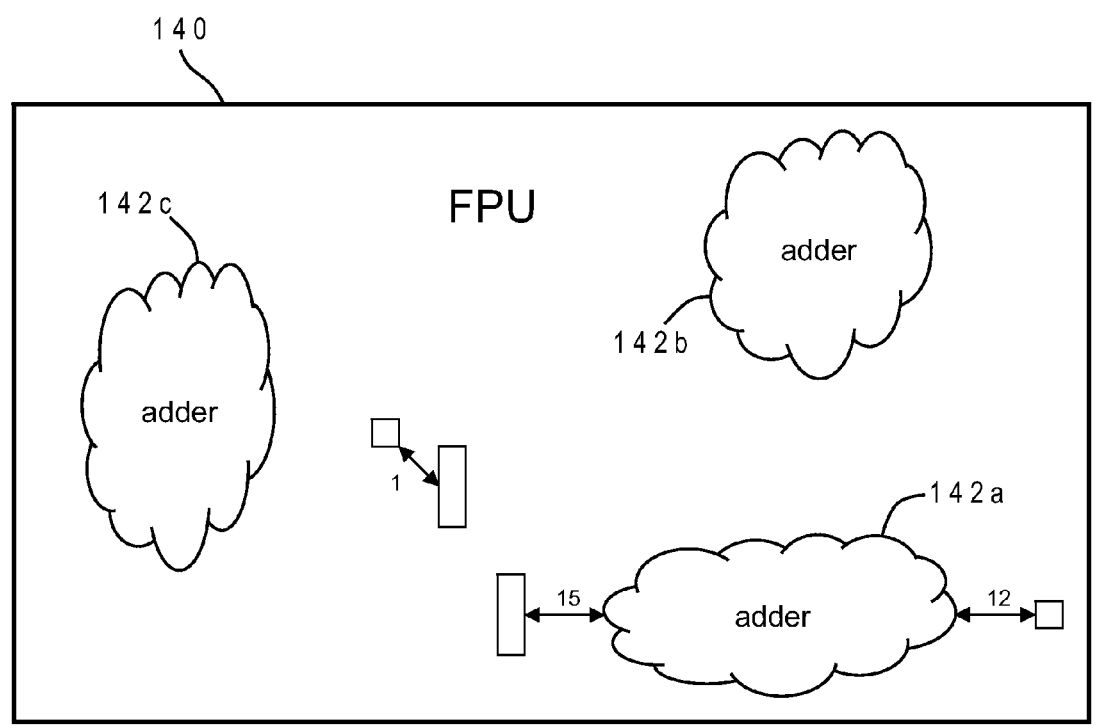
FIG. 7 is a plan view of an FPU constructed in accordance with one implementation of the present disclosure having three adders with soft boundaries resulting in different shapes for the final layout.

FIG. 7 illustrates a simplified example of how the invention might be applied to an FPU 140 having three instances 142a, 142b, 142c of an adder macro. The soft boundaries of adder instances 142a, 142b, 142c are likened to clouds that allow each instance to individually adapt in placement/timing according to local constraints, leading to different shapes for the final layout. Instance 142a has pins that are connected to external components at the left and right sides with very high weights assigned to these boundary nets due to aggressive timing requirements, resulting in a widening of the macro shape. Instance 142b has no local timing issues so its shape remains generally compact, i.e., roughly circular or square. Instance 142c has local constraints which have caused it to stretch vertically. In addition to the different shapes, each instance may have gates of different sizes according to the required drive strengths. FIG. 7 also illustrates how the synthesis for this example uses a default weight of 1 for general components outside of the macros. FIG. 7 can be contrasted with the prior art FPU of FIG. 1 having hard-bounded adders which make it harder to find a quality placement solution. The adaptability of the macro's shape as provided by the present disclosure makes it easier for the synthesis tool to complete the layout. The benefit is a significantly reduced synthesis and tool runtime, more regularity, better engineering change order capabilities, and better control over the synthesis flow. As a further advantage, the top level synthesis process can still be carried out with a fully flattened layout, allowing for a highly flexible final optimization.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present disclosure as defined in the appended claims.

What is claimed is:

1. A computer-implemented method of laying out an integrated circuit design comprising:
receiving a machine-readable description of the integrated circuit design, by executing first instructions in a computer system;
identifying at least one logic block in the description which is to be pre-optimized for placement wherein the at least one logic block has a first plurality of cells, input pins, output pins, and internal nets interconnecting the first plurality of cells, by executing second instructions in the computer system;
deriving timing assertions for the at least one logic block, by executing third instructions in the computer system;
generating a placement abstract for the at least one logic block, by executing fourth instructions in the computer system;
synthesizing the at least one logic block using the timing assertions and the placement abstract, by executing fifth instructions in the computer system;
removing placement information for the synthesized at least one logic block, by executing sixth instructions in the computer system;
assigning lower-hierarchical weights to the internal nets, by executing seventh instructions in the computer system;
assigning higher-hierarchical weights to external nets which interconnect a second plurality of cells outside of the at least one logic block, wherein the lower-hierarchical weights are greater than the higher-hierarchical weights, by executing eighth instructions in the computer system; and
placing the first plurality of cells and the second plurality of cells with a wirelength optimization using the assigned lower-hierarchical weights and the assigned higher-hierarchical weights, by executing ninth instructions in the computer system.

2. The method of claim 1 wherein said identifying includes determining that the machine-readable description contains an attribute for the at least one logic block set to indicate that the at least one logic block is to be pre-optimized.

3. The method of claim 1 wherein said identifying includes determining that the at least one logic block is one of a plurality of logic blocks in the machine-readable description constituting multiple instances of a single logic function.

4. The method of claim 1 wherein the timing assertions include an input arrival time, a required output arrival time, and an output pin capacitance loading for the at least one logic block.

5. The method of claim 1 wherein said generating includes condensing input and output pins of the at least one logic block at a center of gravity of the at least one logic block.

6. The method of claim 1 wherein the lower-hierarchical weights are 10, and the higher-hierarchical weights are 1.

7. A computer system comprising:
one or more processors which process program instructions;
a memory device connected to said one or more processors; and
program instructions residing in said memory device for designing a layout of an integrated circuit by:
receiving a machine-readable description of the integrated circuit design;
identifying at least one logic block in the description which is to be pre-optimized for placement wherein the at least one logic block has a first plurality of cells, input pins, output pins, and internal nets interconnecting the first plurality of cells;
deriving timing assertions for the at least one logic block;
generating a placement abstract for the at least one logic block;
synthesizing the at least one logic block using the timing assertions and the placement abstract;
removing placement information for the synthesized at least one logic block;
assigning lower-hierarchical weights to the internal nets;
assigning higher-hierarchical weights to external nets which interconnect a second plurality of cells outside of the at least one logic block wherein the lower-hierarchical weights are greater than the higher-hierarchical weights; and
placing the first plurality of cells and the second plurality of cells with a wirelength optimization using the assigned lower-hierarchical weights and the assigned higher-hierarchical weights.

8. The computer system of claim 7 wherein said program instructions identify the at least one logic block by determining that the machine-readable description contains an attribute for the at least one logic block set to indicate that the at least one logic block is to be pre-optimized.

9. The computer system of claim 7 wherein said program instructions identify the at least one logic block by determining that the at least one logic block is one of a plurality of logic blocks in the machine-readable description constituting multiple instances of a single logic function.

10. The computer system of claim 7 wherein the timing assertions include an input arrival time, a required output arrival time, and an output pin capacitance loading for the at least one logic block.

11. The computer system of claim 7 wherein said program instructions generate the placement abstract by condensing input and output pins of the at least one logic block at a center of gravity of the at least one logic block.

12. The computer system of claim 7 wherein the lower-hierarchical weights are 10, and the higher-hierarchical weights are 1.

13. A computer program product comprising:
a computer-readable storage medium; and
program instructions residing in said storage medium for designing a layout of an integrated circuit by:
receiving a machine-readable description of the integrated circuit design;
identifying at least one logic block in the description which is to be pre-optimized for placement wherein the at least one logic block has a first plurality of cells, input pins, output pins, and internal nets interconnecting the first plurality of cells;
deriving timing assertions for the at least one logic block;
generating a placement abstract for the at least one logic block;
synthesizing the at least one logic block using the timing assertions and the placement abstract;
removing placement information for the synthesized at least one logic block;
assigning lower-hierarchical weights to the internal nets;
assigning higher-hierarchical weights to external nets which interconnect a second plurality of cells outside of the at least one logic block wherein the lower-hierarchical weights are greater than the higher-hierarchical weights; and
placing the first plurality of cells and the second plurality of cells with a wirelength optimization using the assigned lower-hierarchical weights and the assigned higher-hierarchical weights.

14. The computer program product of claim 13 wherein said program instructions identify the at least one logic block by determining that the machine-readable description contains an attribute for the at least one logic block set to indicate that the at least one logic block is to be pre-optimized.

15. The computer program product of claim 13 wherein said program instructions identify the at least one logic block by determining that the at least one logic block is one of a plurality of logic blocks in the machine-readable description constituting multiple instances of a single logic function.

16. The computer program product of claim 13 wherein the timing assertions include an input arrival time, a required output arrival time, and an output pin capacitance loading for the at least one logic block.

17. The computer program product of claim 13 wherein said program instructions generate the placement abstract by condensing input and output pins of the at least one logic block at a center of gravity of the at least one logic block.

18. The computer program product of claim 13 wherein the lower-hierarchical weights are 10, and the higher-hierarchical weights are 1.

* * * * *